United States Patent
Curtis

(10) Patent No.: US 11,332,153 B2
(45) Date of Patent: May 17, 2022

(54) VEHICLE SYSTEM WITH TRUE OFF MECHANISM AND METHOD OF OPERATION THEREOF

(71) Applicant: MOJ.IO, Inc., Vancouver (CA)

(72) Inventor: James Anthony Curtis, Temecula, CA (US)

(73) Assignee: MOJ.IO, Inc., Vancouver (CA)

( * ) Notice: Subject to any disclaimer, the term of this patent is extended or adjusted under 35 U.S.C. 154(b) by 333 days.

(21) Appl. No.: 16/588,630

(22) Filed: Sep. 30, 2019

(65) Prior Publication Data

US 2021/0094557 A1    Apr. 1, 2021

(51) Int. Cl.
| | |
|---|---|
| *B60W 50/00* | (2006.01) |
| *B60K 6/22* | (2007.10) |
| *B60R 16/023* | (2006.01) |
| *B60W 20/00* | (2016.01) |

(52) U.S. Cl.
CPC .............. *B60W 50/00* (2013.01); *B60K 6/22* (2013.01); *B60R 16/0231* (2013.01); *B60W 20/00* (2013.01); *B60W 2510/0638* (2013.01); *B60W 2520/10* (2013.01); *B60Y 2200/91* (2013.01); *B60Y 2200/92* (2013.01)

(58) Field of Classification Search
CPC ..................................................... B60W 50/00
See application file for complete search history.

(56) References Cited

U.S. PATENT DOCUMENTS

| | | | | |
|---|---|---|---|---|
| 6,832,140 B2* | 12/2004 | Fan | ........................ | G01S 5/0027 340/439 |
| 8,489,271 B2* | 7/2013 | Hergesheimer | ....... | B60R 25/102 701/31.4 |
| 9,080,519 B2* | 7/2015 | Howell | .................... | F02D 41/24 |
| 9,644,977 B2* | 5/2017 | Camisa | .................. | B60W 20/19 |
| 9,953,468 B2* | 4/2018 | Davidson | ............... | G08G 1/052 |
| 2013/0297176 A1 | 11/2013 | Howell et al. | | |
| 2013/0311074 A1 | 11/2013 | Siira | | |
| 2015/0248795 A1 | 9/2015 | Davidson | | |
| 2020/0114768 A1* | 4/2020 | Oestreich | .................. | B60L 3/12 |
| 2021/0094557 A1* | 4/2021 | Curtis | ...................... | B60K 6/22 |

FOREIGN PATENT DOCUMENTS

EP    2503516 A2    9/2012

* cited by examiner

*Primary Examiner* — Michaela Berns
(74) *Attorney, Agent, or Firm* — Perspectives Law Group, Corp.

(57) ABSTRACT

A method of operation of a vehicle system comprising: determining an activity level of a vehicle bus; determining a running level for the activity level for a running period; detecting an off level for the activity level dropping from the running level; generating a true off state for an engine based on an off level; and calculating vehicle usage based on the true off state.

20 Claims, 7 Drawing Sheets

VEHICLE SYSTEM WITH TRUE OFF MECHANISM AND METHOD OF OPERATION THEREOF

TECHNICAL FIELD

An embodiment of the present invention relates generally to a vehicle system, and more particularly to a system with a true off mechanism.

BACKGROUND ART

Modern transportation systems, especially vehicle systems such as combustion vehicles, electric vehicles, or hybrid vehicles, are providing increasing levels of functionality to support modern life including additional status monitoring, connectivity services, and location-based information services. Research and development in the existing technologies can take a myriad of different directions.

As users become more empowered with the growth of more intelligence in vehicles, true off determinations are needed to determine and improve energy efficiency while new and old paradigms begin to take advantage of this new space. One such space is increased diagnostic information for these vehicles. However, in the midst of increased diagnostic information, other challenges arise with vehicles.

Thus, a need still remains for a vehicle system with a true off mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a vehicle system including: determining an activity level of a vehicle bus, determining a running level for the activity level for a running period; detecting an off level for the activity level dropping from the running level, generating a true off state for an engine based on the off level, and calculating a vehicle usage based on the true off state.

An embodiment of the present invention provides a vehicle system, including: a communication unit configured to: determine an activity level of a vehicle bus, determine a running level for the activity level for a running period; a control unit, coupled to the communication unit, configured to: detect an off level for the activity level dropping from the running level, generate a true off state for an engine based off level, and calculate vehicle usage based on the true off state.

An embodiment of the present invention provides a non-transitory computer readable medium including instructions executable by a control circuit for a vehicle system, including: determining an activity level of a vehicle bus, determining a running level for the activity level for a running period, detecting an off level for the activity level dropping from the running level, generating a true off state for an engine based on the off level, and calculating vehicle usage based on the true off state.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
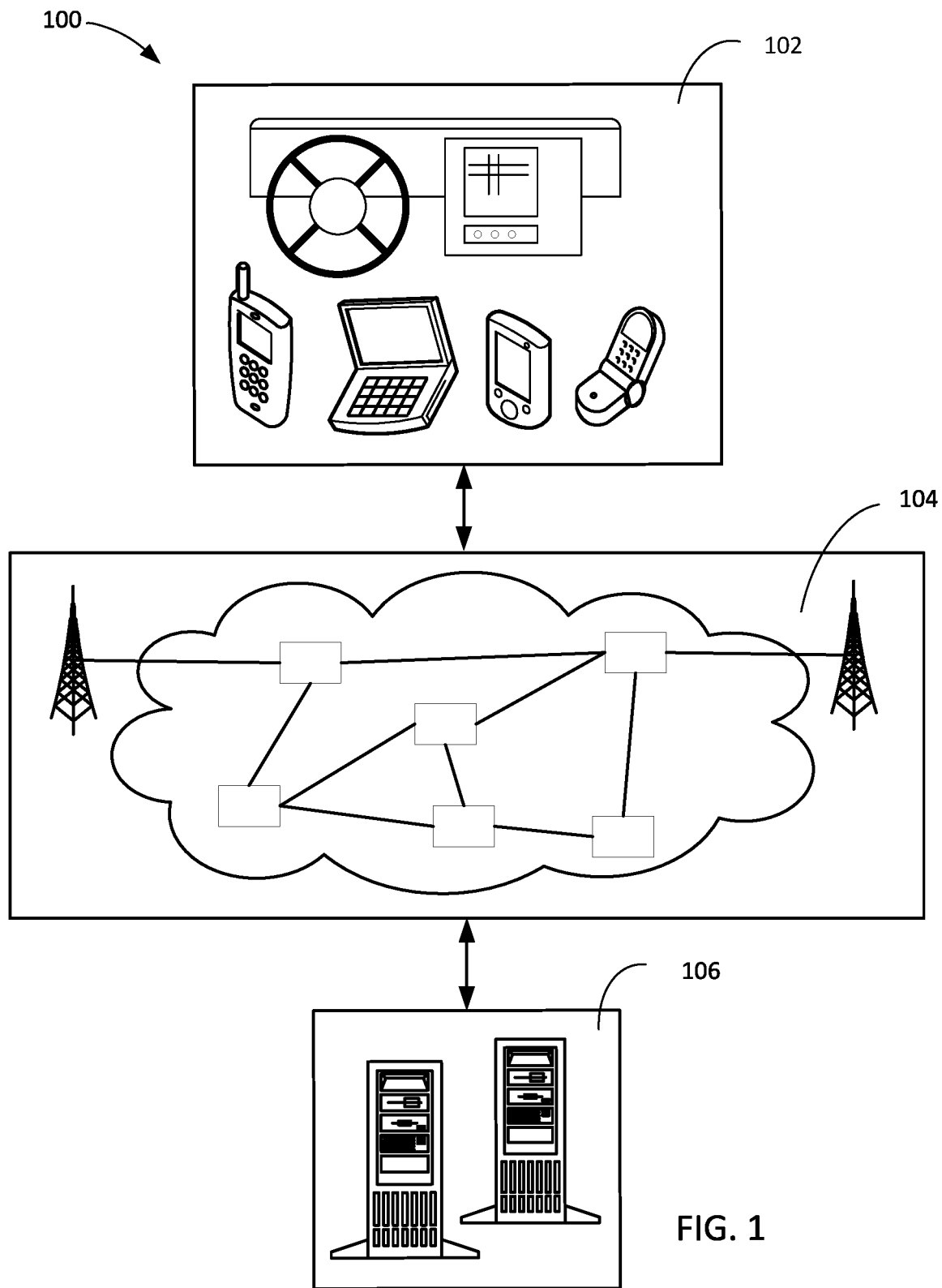
FIG. 1 is a vehicle system with a true off mechanism in an embodiment of the present invention.

Embodiments provide the vehicle system, the electric vehicle, the combustion vehicle, or a combination thereof can minimize the complexity to generate a true off state by detecting the activity level of the vehicle bus. The correct detection of the activity level of the vehicle bus provides for the determination of the true off state for the vehicle system.

Embodiments provide the vehicle system, the electric vehicle, the combustion vehicle, or a combination thereof can filter out a stop-event for the engine as the true off state for a vehicle system.

Embodiments provide the vehicle system, the electric vehicle, the combustion vehicle, or a combination thereof can improve the reliability of diagnostics information by properly generating the true off state based on the activity level of the vehicle bus.

Embodiments provide the vehicle system, the electric vehicle, the combustion vehicle, or a combination thereof can improve the reliability of the true off state not only by confirming the activity level but also the revolutions per minute (RPM), the vehicle speed, or a combination thereof.

Embodiments provide the simplified and robust determination of the true off state allowing for the vehicle system, the electric vehicle, the combustion vehicle, or a combination thereof to provide accurate diagnostic information. As an example, navigation systems can correctly detect trips to gather accurate records for the vehicle system, the electric vehicle, the combustion vehicle, or a combination thereof. Also as an example, the vehicle system, the electric vehicle, the combustion vehicle, or a combination thereof can accurately calculate a trip, mileage, and fuel utilization.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention. The terms first, second, etc. can be used throughout as part of element names and are used as a matter of descriptive convenience and are not intended to have any other significance or provide limitations for an embodiment.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a vehicle system 100 with a true off mechanism in an embodiment of the present invention. The vehicle system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a vehicle, a telematics system in a vehicle, a computing device, a cellular phone, a tablet computer, a smart phone, a notebook computer, vehicle embedded navigation system, or computing device. The first device 102 can couple, either directly or indirectly, to the communication path 104 to communicate with the second device 106 or can be a stand-alone device.

The second device 106 can be any of a variety of centralized or decentralized computing devices, sensor devices to take measurements or record environmental information, such as sensor instruments, sensor equipment, or a sensor array. For example, the second device 106 can be a multimedia computer, a laptop computer, a desktop computer, grid-computing resources, a virtualized computer resource, cloud computing resource, routers, switches, peer-to-peer distributed computing devices, or a combination thereof.

The second device 106 can be mounted externally or internally to a vehicle, centralized in a single room or within a vehicle, distributed across different rooms, distributed across different geographical locations, embedded within a telecommunications network. The second device 106 can couple with the communication path 104 to communicate with the first device 102.

For illustrative purposes, the vehicle system 100 is described with the second device 106 as a computing device, although it is understood that the second device 106 can be different types of devices, such as a standalone sensor or measurement device. Also for illustrative purposes, the vehicle system 100 is shown with the second device 106 and the first device 102 as end points of the communication path 104, although it is understood that the vehicle system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
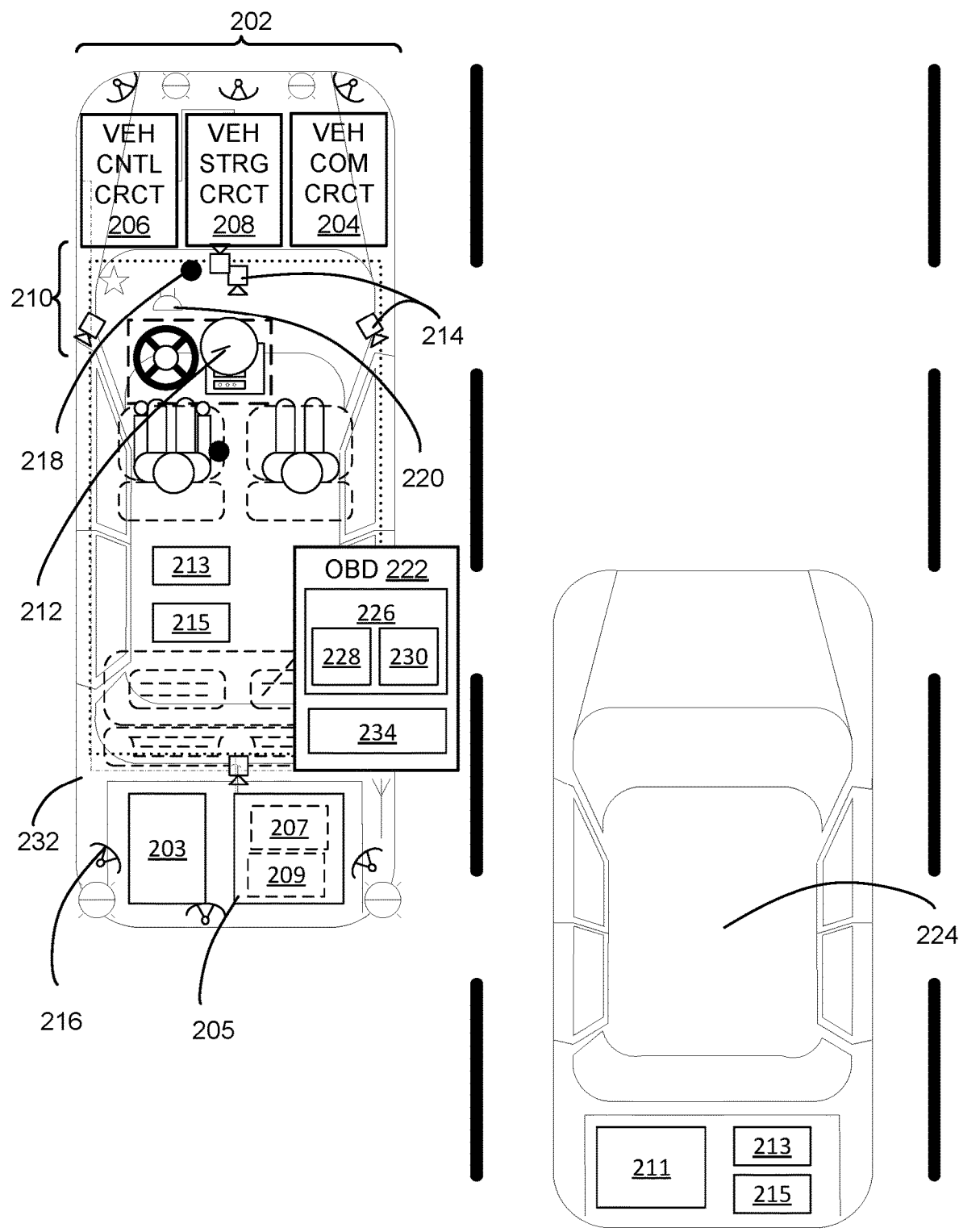
FIG. 2 is an example a top plan view illustration of various vehicles for the vehicle system.

Referring now to FIG. 2, therein is shown an example a top plan view illustration of various vehicles for the vehicle system 100 of FIG. 1. As an example, the vehicle system 100 can include or interact with the first device 102 of FIG. 1 as an electric vehicle 202, a combustion vehicle 224, or a combination thereof. The electric vehicle 202, the combustion vehicle 224, or a combination thereof can also include one or more of environmental sensors 210.

The electric vehicle 202 is an object or a machine used for transporting people or goods. The electric vehicle 202 can also be capable of providing assistance in maneuvering or operating the object or the machine.

For example, the electric vehicle 202 can be different types of vehicles. As a specific example, the electric vehicle 202 can be an automobile with only an electric engine 203. As a further specific example, the electric vehicle 202 can be a hybrid automobile that can have a hybrid engine 205 (as shown by dotted box in FIG. 2) including a combustion portion 207 (as shown by dotted box in FIG. 2) and an electric portion 209 (as shown by dotted box in FIG. 2). For further example, the electric vehicle 202 can include a car, a truck, a cart, or a combination thereof.

The combustion vehicle 224 is an object or a machine used for transporting people or goods. The combustion vehicle 224 can also be capable of providing assistance in maneuvering or operating the object or the machine. The combustion vehicle 224 runs with the engine that is not an electric engine 203 or not include an electric portion 209 of the hybrid engine 205. The combustion vehicle 224 only has a combustion engine 211 that operates based on non-electrical fuel, such as petroleum, ethanol, hydrogen, diesel, or a combination thereof. For example, the combustion vehicle 224 can include a car, a truck, a cart, or a combination thereof.

The electric vehicle 202 can include a device, a circuit, one or more specific sensors, or a combination thereof for providing assistance or additional information to control, maneuver, or operate the electric vehicle 202. The electric vehicle 202 can include a vehicle communication circuit 204, a vehicle control circuit 206, a vehicle storage circuit 208, other interfaces, or a combination thereof.

For brevity and simplicity, the combustion vehicle 224 can also include the vehicle communication circuit 204, the vehicle control circuit 206, the vehicle storage circuit 208, other interfaces, or the combination thereof but are numbered and named the same as the circuits in the electric vehicle 202. The functions can be similar but not necessarily the same between the circuits within the electric vehicle 202 and the combustion vehicle 224.

The electric vehicle 202 and the combustion vehicle 224 can also include on-board diagnostics 222 (OBD) that can be accessed by the vehicle control circuit 206. As an example, the vehicle control circuit 206 can access the on-board diagnostics 222 with the vehicle communication circuit 204. The electric vehicle 202 and the combustion vehicle 224 can store and retrieve the on-board diagnostics 222 to and from the vehicle storage circuit 208.

The on-board diagnostics 222 represent information about the electric vehicle 202, the combustion vehicle 224, or a combination thereof. For example, the on-board diagnostics 222 can provide status or the state of the electric vehicle 202, the combustion vehicle 224, or a portion thereof.

As a specific example, the on-board diagnostics 222 can represent information about a portion of the electric engine 203, the combustion engine 211, or the hybrid engine 205, such as the electric portion 209 or the combustion portion 207, or items that operates with the electric engine 203, the combustion engine 211, or the hybrid engine 205 for either the electric portion 209 or the combustion portion 207. Continuing with the example, the on-board diagnostics 222 can provide information about a battery 213 or an alternator 215 operating in association with the battery 213.

Although the battery 213 can differ in size, capacity, and type, depending on the engine being the electric engine 203, the hybrid engine 205, or the combustion engine 211, the battery 213 provides voltage values that can be read as part of the on-board diagnostics 222. Further, the alternator 215 similar to the battery 213 for the various types of engines, functions to replenish or recharge the battery 213. As the alternator 215 charges the battery 213, the voltage of the battery 213 can also be read as part of the on-board diagnostics 222.

Also as a specific example, the on-board diagnostics 222 can represent an engine status of the electric engine 203, the electric portion 209 of the hybrid engine 205, or a combination thereof. The on-board diagnostics 222 can also represent an engine status of the combustion engine 211, the combustion portion 207 of the hybrid engine 205, or a combination thereof. An example of the engine status can include the ignition factors 226.

The ignition factors 226 represent various information about or the state of the electric engine 203 or the electric portion 209 of the hybrid engine 205. The ignition factors 226 can also represent various information about or the state of the combustion engine 211 or the combustion portion 207 of the hybrid engine 205. For example, the ignition factors 226 can include an ignition status 228 and an ignition message 230.

The ignition status 228 represents the current state of the ignition. The ignition status 228 can represent whether the electric engine 203, the hybrid engine 205, or the combustion engine 211 is on or off. The term "on" refers to the electric engine 203, the hybrid engine 205, or the combustion engine 211 is running. The term "off" refers to the electric engine 203, the hybrid engine 205, or the combustion engine 211 is not running. The ignition message 230 provides the information about the ignition including, as an example, the ignition status 228.

Further as a specific example, the on-board diagnostics 222 can represent a vehicle usage 234 of the electric vehicle 202, the combustion vehicle 224, or a combination thereof. The vehicle usage 234 can represent various information about or the state of the electric vehicle 202, the combustion vehicle 224, or a combination thereof. For example, the vehicle usage 234 include trip calculation, mileage, fuel utilization, or a combination thereof. Also as an example, the vehicle usage 234 can be read and obtained from the on-board diagnostics 222, as some described throughout this description. Further for example, the vehicle usage 234 can be calculated based on the information from the on-board diagnostics 222. As specific example, the vehicle usage 234 can be calculate for fuel efficiency based on mileage and fuel level readings from the on-board diagnostics 222. The on-board diagnostics 222 can be carried over a vehicle bus 232 to communicate the engine status of the combustion engine 211, the combustion portion 207 of the hybrid engine 205, or a combination thereof.

As an example, the vehicle bus 232 can be a controller area network (CAN) of the electric vehicle 202 or the combustion vehicle 224 that allows interaction between the vehicle communication circuit 204, the vehicle control circuit 206, a vehicle storage circuit 208, the on-board diagnostics 222, other interfaces, or a combination thereof.

The vehicle storage circuit 208 can include a functional unit or circuit integral to the electric vehicle 202, the combustion vehicle 224, or a combination thereof and configured to store and recall information. The vehicle storage circuit 208 can be a volatile memory, a nonvolatile memory, an internal memory, an external memory, or a combination thereof. For example, the vehicle storage circuit 208 can be a nonvolatile storage such as non-volatile random access memory (NVRAM), Flash memory, disk storage, or a volatile storage such as static random access memory (SRAM).

The vehicle storage circuit 208 can store vehicle software, other relevant data, such as input information, information from sensors, processing results, information predetermined or preloaded by the vehicle system 100 or vehicle manufacturer, or a combination thereof. The vehicle storage circuit 208 can store the information for the on-board diagnostics 222.

The vehicle control circuit 206 can include a function unit or circuit integral to the electric vehicle 202, the combustion vehicle 224, or a combination thereof and configured to execute or implement instructions. The vehicle control circuit 206 can execute or implement the vehicle software to provide the intelligence of the electric vehicle 202, the combustion vehicle 224, the vehicle system 100, or a combination thereof. The vehicle control circuit 206 can respond to requests for the on-board diagnostics 222. The request can be from other parts of the electric vehicle 202, the combustion vehicle 224, the vehicle system 100, or a combination thereof or external to the vehicle system 100.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof.

The vehicle communication circuit 204 can include a function unit or circuit integral to the electric vehicle 202, the combustion vehicle 224, or a combination thereof and configured to enable external communication to and from the electric vehicle 202 or the combustion vehicle 224. For example, the vehicle communication circuit 204 can permit the electric vehicle 202, the combustion vehicle 224, or a combination thereof to communicate with the first device 102 of FIG. 1, the second device 106 of FIG. 1, the communication path 104 of FIG. 1, or a combination thereof. The vehicle communication circuit 204 can provide the on-board diagnostics 222 to other portions of the electric vehicle 202, the combustion vehicle 224, the vehicle system 100, or a combination thereof or external to the vehicle system 100.

The vehicle communication circuit 204 can also function as a communication hub allowing the electric vehicle 202, the combustion vehicle 224, or a combination thereof to function as part of the communication path 104 and not limited to be an end point or terminal circuit to the communication path 104. The vehicle communication circuit 204 can include active and passive components, such as microelectronics or an antenna, for interaction with the communication path 104. For example, the vehicle communication circuit 204 can include a modem, a transmitter, a receiver, a port, a connector, or a combination thereof for wired communication, wireless communication, or a combination thereof.

The vehicle communication circuit 204 can couple with the communication path 104 to send or receive information directly between the vehicle communication circuit 204 and the first device 102, the second device 106, tor a combination thereof as end points of the communication, such as for direct line-of-sight communication or peer-to-peer communication. The vehicle communication circuit 204 can further couple with the communication path 104 to send or receive information through a server or another intermediate device in between end points of the communication.

The electric vehicle 202, the combustion vehicle 224, or a combination thereof can further include various interfaces. The electric vehicle 202 or the combustion vehicle 224 can include one or more interfaces for interaction or internal communication between functional units or circuits of the electric vehicle 202 or the combustion vehicle 224, respectively. For example, the electric vehicle 202, the combustion vehicle 224, or a combination thereof can include one or more interfaces, such as drivers, firmware, wire connections or buses, protocols, or a combination thereof, for the vehicle storage circuit 208, the vehicle control circuit 206, or a combination thereof. As a further example, the electric vehicle 202, the combustion vehicle 224, or a combination thereof can include a vehicle bus 232.

The electric vehicle 202 or the combustion vehicle 224 can further include one or more interfaces for interaction with an occupant, an operator or a driver, a passenger, or a combination thereof relative to the electric vehicle 202 or the combustion vehicle 224, respectively. For example, the electric vehicle 202, the combustion vehicle 224, or a combination thereof can include a user interface including input or output devices or circuits, such as a screen or touch screen, a speaker, a microphone, a keyboard or other input devices, an instrument panel, or a combination thereof.

The electric vehicle 202 or the combustion vehicle 224 can further include one or more interfaces along with switches or actuators for physically controlling movable components of the electric vehicle 202 or the combustion vehicle 224, respectively. For example, the electric vehicle 202 or the combustion vehicle 224 can include the one or more interfaces along with the controlling mechanisms to physically perform and control the maneuvering of the electric vehicle 202 or the combustion vehicle 224, respectively, such as for automatic driving or maneuvering features.

The functional units or circuits in the electric vehicle 202 or the combustion vehicle 224 can work individually and independently of the other functional units or circuits. The electric vehicle 202 or the combustion vehicle 224 can work individually and independently from the first device 102, the communication path 104, the second device 106, other devices or vehicles, or a combination thereof.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device for detecting or identifying environment of the electric vehicle 202 or the combustion vehicle 224. The environmental sensors 210 can detect, identify, determine, or a combination thereof for the electric vehicle 202 or the combustion vehicle 224 itself, such as for status or movement thereof. The environmental sensors 210 can detect, identify, determine, or a combination thereof for environment within a cabin of the electric vehicle 202 or the combustion vehicle 224, an environment external to and surrounding the electric vehicle 202 or the combustion vehicle 224, or a combination thereof.

For example, the environmental sensors 210 can include a location-movement sensor 212, a visual sensor 214, a radar sensor 216, an accessory sensor 218, a volume sensor 220, or a combination thereof. The location-movement sensor 212 can identify or calculate a geographic location of the electric vehicle 202 or the combustion vehicle 224, determine a movement of the electric vehicle 202 or the combustion vehicle 224, or a combination thereof. Examples of the location-movement sensor 212 can include an accelerometer, a speedometer, a GPS receiver or device, a gyroscope or a compass, or a combination thereof. The electric vehicle 202 or the combustion vehicle 224 can include the environmental sensors 210 other than or in addition to the location-movement sensor 212, such as thermal sensor. The thermal sensor can capture and provide temperature readings for portions of the electric vehicle 202 or the combustion vehicle 224. The thermal sensor can also capture and provide temperature readings external to the electric vehicle 202 or the combustion vehicle 224.

The visual sensor 214 can include a sensor for detecting or determining visual information representing the environment external to and surrounding the electric vehicle 202 or the combustion vehicle 224. The visual sensor 214 can include a camera attached to or integral with the electric vehicle 202 or the combustion vehicle 224. For example, the visual sensor 214 can include a camera, such as forward facing camera, a rear-view or back-up camera, a side-view or a blind-spot camera, or a combination thereof. Also for example, the visual sensor 214 can include an infrared sensor or a night vision sensor.

The visual sensor 214 can further include a camera on the first device 102 connected to and interacting with the electric vehicle 202 or the combustion vehicle 224. The visual sensor 214 can further include a cabin camera for detecting or determining visual information inside the vehicle or cabin of the vehicle.

The radar sensor 216 can include an object-detection system, device, or circuit. The radar sensor 216 can determine or identify an existence of an object or a target, such as an obstacle or another vehicle, external to the electric vehicle 202 or the combustion vehicle 224, a relative location or a distance between the object or the target and the electric vehicle 202 or the combustion vehicle 224, or a combination thereof.

The radar sensor 216 can utilize radio waves to determine or identify an existence of the object or the target, the relative location or a distance from the electric vehicle 202 or the combustion vehicle 224, or a combination thereof. For example, the radar sensor 216 can include a proximity sensor or warning system, such as for an area in front of, behind, adjacent to or on a side of, or a combination thereof geographically or physically relative to the electric vehicle 202 or the combustion vehicle 224.

The accessory sensor 218 can include a sensor for determining or detecting a status of a subsystem or a feature of the electric vehicle 202 or the combustion vehicle 224. The accessory sensor 218 can determine or detect the status or a setting for windshield wipers, turn signals, gear setting, headlights, or a combination thereof.

The volume sensor 220 can include a sensor for detecting or determining sounds for the electric vehicle 202 or the combustion vehicle 224. The volume sensor 220 can include a microphone for detecting or determining sounds within a cabin of the electric vehicle 202 or the combustion vehicle 224. The volume sensor 220 can further include a circuit for detecting or determining a volume level or an output level of speakers within the electric vehicle 202 or the combustion vehicle 224.

The electric vehicle 202 or the combustion vehicle 224 can use one or more of the environmental sensors 210 to generate the on-board diagnostics 222 describing or representing information regarding the environment within or surrounding the electric vehicle 202 or the combustion vehicle 224. The on-board diagnostics 222 can be further processed with the vehicle control circuit 206, stored in the vehicle storage circuit 208, communicated to another device through the vehicle control circuit 206, or a combination thereof.

The electric vehicle 202 or the combustion vehicle 224 can further include a user device or a mobile device illustrated in FIG. 1. For example, the electric vehicle 202 or the combustion vehicle 224 can include the first device 102.

As a more specific example, the vehicle communication circuit 204, the vehicle control circuit 206, the vehicle storage circuit 208, the environmental sensors 210, one or more interfaces, or a combination thereof can be included in or make up the first device 102 included in or integral with the electric vehicle 202 or the combustion vehicle 224. Also as a more specific example, the electric vehicle 202 or the combustion vehicle 224 can include or be integral with the first device 102 including an embedded vehicle system, an infotainment system, a smart driving or a driver assistance system, a self-driving or a maneuvering system for the vehicle, or a combination thereof.

Figure 3:
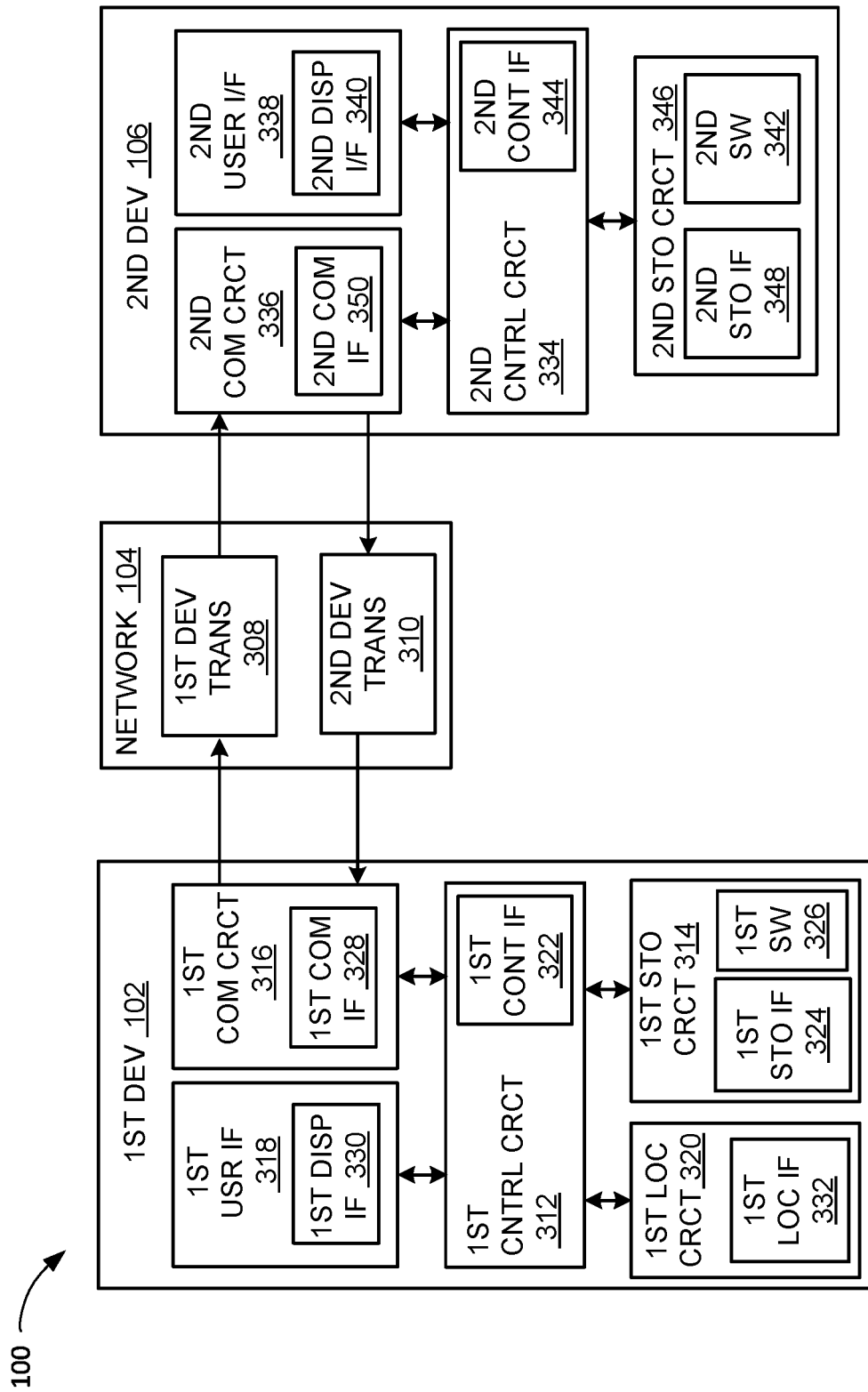
FIG. 3 is an exemplary block diagram of the vehicle system.

Referring now to FIG. 3, therein is shown an exemplary block diagram of the vehicle system 100. The vehicle system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the vehicle system 100 is shown with the first device 102 as a client device, although it is understood that the vehicle system 100 can include the first device 102 as a different type of device. For example, the first device 102 can be a server including a display interface.

Also for illustrative purposes, the vehicle system 100 is shown with the second device 106 as a server, although it is understood that the vehicle system 100 can include the second device 106 as a different type of device. For example, the second device 106 can be a client device.

Further, for illustrative purposes, the vehicle system 100 is shown with interaction between the first device 102 and the second device 106, although it is understood that the first device 102 can similarly interact another instance of the first device 102. Similarly, the second device 106 can similarly interact with another instance of the second device 106.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 312, a first storage circuit 314, a first communication circuit 316, and a first user interface 318, and a first location circuit 320. The first control circuit 312 can include a first control interface 322. The first control circuit 312 can execute a first software 326 to provide the intelligence of the vehicle system 100.

The first control circuit 312 can be implemented in a number of different manners. For example, the first control circuit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control circuit 312 and other functional units or circuits in the first device 102. The first control interface 322 can also be used for communication that is external to the first device 102.

The first control interface 322 can receive information from the other functional units/circuits or from external sources, or can transmit information to the other functional units/circuits or to external destinations. The external sources and the external destinations refer to sources and destinations external to the first device 102.

The first control interface 322 can be implemented in different ways and can include different implementations depending on which functional units/circuits or external units/circuits are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage circuit 314 can store the first software 326. The first storage circuit 314 can also store the relevant information, such as data representing incoming images, data representing previously presented image, sound files, or a combination thereof.

The first storage circuit 314 can be a volatile memory, a nonvolatile memory, an internal memory, an external memory, or a combination thereof. For example, the first storage circuit 314 can be a nonvolatile storage such as non-volatile random access memory (NVRAM), Flash memory, disk storage, or a volatile storage such as static random access memory (SRAM).

The first storage circuit 314 can include a first storage interface 324. The first storage interface 324 can be used for communication between the first storage circuit 314 and other functional units or circuits in the first device 102. The first storage interface 324 can also be used for communication that is external to the first device 102.

The first storage interface 324 can receive information from the other functional units/circuits or from external sources, or can transmit information to the other functional units/circuits or to external destinations. The external sources and the external destinations refer to sources and destinations external to the first device 102.

The first storage interface 324 can include different implementations depending on which functional units/circuits or external units/circuits are being interfaced with the first storage circuit 314. The first storage interface 324 can be implemented with technologies and techniques similar to the implementation of the first control interface 322.

The first communication circuit 316 can enable external communication to and from the first device 102. For example, the first communication circuit 316 can permit the first device 102 to communicate with the second device 106 of FIG. 1, an attachment, such as a peripheral device or a desktop computer, and the communication path 104.

The first communication circuit 316 can also function as a communication hub allowing the first device 102 to function as part of the communication path 104 and not limited to be an end point or terminal circuit to the communication path 104. The first communication circuit 316 can include active and passive components, such as microelectronics or an antenna, for interaction with the communication path 104.

The first communication circuit 316 can include a first communication interface 328. The first communication interface 328 can be used for communication between the first communication circuit 316 and other functional units or circuits in the first device 102. The first communication interface 328 can receive information from the other functional units/circuits or can transmit information to the other functional units or circuits.

The first communication interface 328 can include different implementations depending on which functional units or circuits are being interfaced with the first communication circuit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device. The first display interface 330 can include a display, a projector, a video screen, a speaker, or any combination thereof.

The first control circuit 312 can operate the first user interface 318 to display information generated by the vehicle system 100. The first control circuit 312 can also execute the first software 326 for the other functions of the vehicle system 100, including receiving location information from the first location circuit 320. The first control circuit 312 can further execute the first software 326 for interaction with the communication path 104 via the first communication circuit 316.

The first location circuit 320 can generate location information, current heading, current acceleration, and current speed of the first device 102, as examples. The first location circuit 320 can be implemented in many ways. For example, the first location circuit 320 can function as at least a part of the global positioning system, an inertial vehicle system, a cellular-tower location system, a pressure location system, or any combination thereof. Also, for example, the first location circuit 320 can utilize components such as an accelerometer or global positioning system (GPS) receiver.

The first location circuit 320 can include a first location interface 332. The first location interface 332 can be used for communication between the first location circuit 320 and other functional units or circuits in the first device 102. The first location interface 332 can also be used for communication external to the first device 102.

The first location interface 332 can receive information from the other functional units/circuits or from external sources, or can transmit information to the other functional units/circuits or to external destinations. The external sources and the external destinations refer to sources and destinations external to the first device 102.

The first location interface 332 can include different implementations depending on which functional units/circuits or external units/circuits are being interfaced with the first location circuit 320. The first location interface 332 can be implemented with technologies and techniques similar to the implementation of the first control circuit 312.

The second device 106 can be optimized for implementing an embodiment of the present invention in a multiple device embodiment with the first device 102. The second device 106 can provide the additional or higher performance processing power compared to the first device 102. The second device 106 can include a second control circuit 334, a second communication circuit 336, a second user interface 338, and a second storage circuit 346.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340 of FIG. 3. The second display interface 340 can include a display, a projector, a video screen, a speaker, or any combination thereof.

The second control circuit 334 can execute a second software 342 of FIG. 3 to provide the intelligence of the second device 106 of the vehicle system 100. The second software 342 can operate in conjunction with the first software 326. The second control circuit 334 can provide additional performance compared to the first control circuit 312.

The second control circuit 334 can operate the second user interface 338 to display information. The second control circuit 334 can also execute the second software 342 for the other functions of the vehicle system 100, including operating the second communication circuit 336 to communicate with the first device 102 over the communication path 104.

The second control circuit 334 can be implemented in a number of different manners. For example, the second control circuit 334 can be a processor, an embedded processor, a microprocessor, hardware control logic, a hardware finite state machine (FSM), a digital signal processor (DSP), or a combination thereof.

The second control circuit 334 can include a second control interface 344 of FIG. 3. The second control interface 344 can be used for communication between the second control circuit 334 and other functional units or circuits in the second device 106. The second control interface 344 can also be used for communication that is external to the second device 106.

The second control interface 344 can receive information from the other functional units/circuits or from external sources, or can transmit information to the other functional units/circuits or to external destinations. The external sources and the external destinations refer to sources and destinations external to the second device 106.

The second control interface 344 can be implemented in different ways and can include different implementations depending on which functional units/circuits or external units/circuits are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage circuit 346 can store the second software 342. The second storage circuit 346 can also store the information such as data representing incoming images, data representing previously presented image, sound files, or a combination thereof. The second storage circuit 346 can be sized to provide the additional storage capacity to supplement the first storage circuit 314.

For illustrative purposes, the second storage circuit 346 is shown as a single element, although it is understood that the second storage circuit 346 can be a distribution of storage elements. Also for illustrative purposes, the vehicle system 100 is shown with the second storage circuit 346 as a single hierarchy storage system, although it is understood that the vehicle system 100 can include the second storage circuit 346 in a different configuration. For example, the second storage circuit 346 can be formed with different storage technologies forming a memory hierarchal system including different levels of caching, main memory, rotating media, or off-line storage.

The second storage circuit 346 can be a volatile memory, a nonvolatile memory, an internal memory, an external memory, or a combination thereof. For example, the second storage circuit 346 can be a nonvolatile storage such as non-volatile random access memory (NVRAM), Flash memory, disk storage, or a volatile storage such as static random access memory (SRAM).

The second storage circuit 346 can include a second storage interface 348. The second storage interface 348 can be used for communication between the second storage circuit 346 and other functional units or circuits in the second device 106. The second storage interface 348 can also be used for communication that is external to the second device 106.

The second storage interface 348 can receive information from the other functional units/circuits or from external sources, or can transmit information to the other functional units/circuits or to external destinations. The external sources and the external destinations refer to sources and destinations external to the second device 106.

The second storage interface 348 can include different implementations depending on which functional units/circuits or external units/circuits are being interfaced with the second storage circuit 346. The second storage interface 348 can be implemented with technologies and techniques similar to the implementation of the second control interface 344.

The second communication circuit 336 can enable external communication to and from the second device 106. For example, the second communication circuit 336 can permit the second device 106 to communicate with the first device 102 over the communication path 104.

The second communication circuit 336 can also function as a communication hub allowing the second device 106 to function as part of the communication path 104 and not limited to be an end point or terminal unit or circuit to the communication path 104. The second communication circuit 336 can include active and passive components, such as microelectronics or an antenna, for interaction with the communication path 104.

The second communication circuit 336 can include a second communication interface 350. The second communication interface 350 can be used for communication between the second communication circuit 336 and other functional units or circuits in the second device 106. The second communication interface 350 can receive information from the other functional units/circuits or can transmit information to the other functional units or circuits.

The second communication interface 350 can include different implementations depending on which functional units or circuits are being interfaced with the second communication circuit 336. The second communication interface 350 can be implemented with technologies and techniques similar to the implementation of the second control interface 344.

The first communication circuit 316 can couple with the communication path 104 to send information to the second device 106 in the first device transmission 308. The second device 106 can receive information in the second communication circuit 336 from the first device transmission 308 of the communication path 104.

The second communication circuit 336 can couple with the communication path 104 to send information to the first device 102 in the second device transmission 310. The first device 102 can receive information in the first communication circuit 316 from the second device transmission 310 of the communication path 104. The vehicle system 100 can be executed by the first control circuit 312, the second control circuit 334, or a combination thereof. For illustrative purposes, the second device 106 is shown with the partition containing the second user interface 338, the second storage circuit 346, the second control circuit 334, and the second communication circuit 336, although it is understood that the second device 106 can include a different partition. For example, the second software 342 can be partitioned differently such that some or all of its function can be in the second control circuit 334 and the second communication circuit 336. Also, the second device 106 can include other functional units or circuits not shown in FIG. 3 for clarity.

The functional units or circuits in the first device 102 can work individually and independently of the other functional units or circuits. The first device 102 can work individually and independently from the second device 106 and the communication path 104.

The functional units or circuits in the second device 106 can work individually and independently of the other functional units or circuits. The second device 106 can work individually and independently from the first device 102 and the communication path 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the vehicle system 100 is described by operation of the first device 102 and the second device 106. It is understood that the first device 102 and the second device 106 can operate any of the modules and functions of the vehicle system 100.

Figure 4:
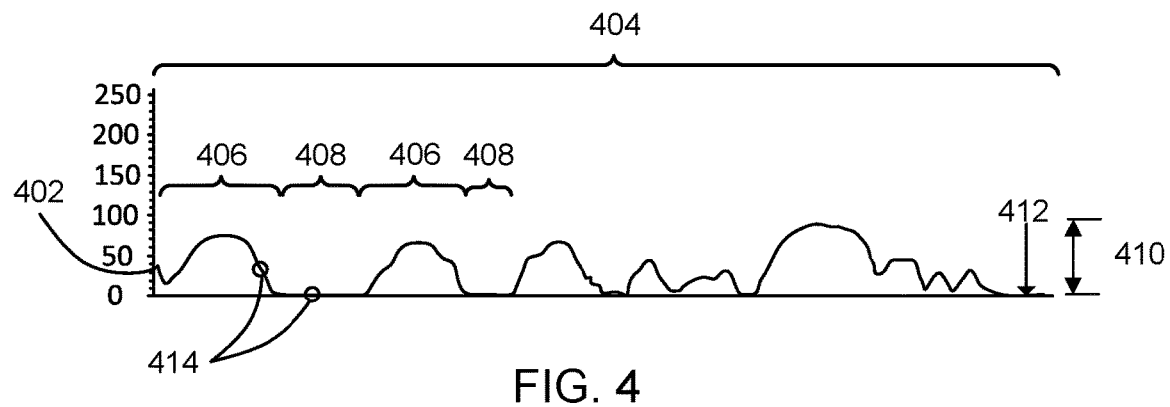
FIG. 4 is a graphical view of an example of a vehicle speed.

Referring now to FIG. 4, therein is shown a graphical view of an example of a vehicle speed 402. The vehicle speed 402 represents the rate of movement for the electric vehicle 202 of FIG. 2, the combustion vehicle 224 of FIG. 2, or a combination thereof. In this example, value for the vehicle speed 402 can be determined based on a read for the on-board diagnostics 222 of FIG. 2 of the electric vehicle 202, the combustion vehicle 224, or a combination thereof. The graphical view depicts the vehicle speed 402 when the electric vehicle 202 or the combustion vehicle 224 is moving and stopped.

The speed graphical view depicts a speed profile 404 relative to a y-axis and an x-axis. The y-axis represents the speed levels or speed values for the vehicle speed 402. The values shown on the y-axis are examples and embodiments are not limited to the values shown along the y-axis. The x-axis represents time although units for the x-axis is not shown in FIG. 4.

The speed profile 404 represents speed levels or speed values for the electric vehicle 202, the combustion vehicle 224, or a combination thereof. For example, the speed profile 404 can depict the values for the vehicle speed 402 over time. The speed profile 404 can be generated based on the vehicle speed 402 from the on-board diagnostics 222.

In this example, the speed profile 404 is shown to include moving periods 406 and stop periods 408. The moving periods 406 are when the electric vehicle 202 or the combustion vehicle 224 is moving or non-stationary. This example shows the speed profile 404 with the moving periods 406 intermixed with the stop periods 408. The moving periods 406 have a non-zero speed 410 for the vehicle speed 402.

The non-zero speed 410 is the speed level or the speed value for the electric vehicle 202, the combustion vehicle 224, or a combination thereof in motion and non-stationary. The non-zero speed 410 can be determined from the vehicle speed 402 from the on-board diagnostics 222. Continuing with this example, the non-zero speed 410 is greater than 0 miles per hour or 0 kilometers per hour.

The stop periods 408 are when the electric vehicle 202 or the combustion vehicle 224 is stationary or has no movement. The stop periods 408 have a zero speed 412 for the vehicle speed 402.

The zero speed 412 is the speed value or the speed level for the electric vehicle 202, the combustion vehicle 224, or a combination thereof in non-motion and stationary. The zero speed 412 can be determined from the vehicle speed 402 from the on-board diagnostics 222. In this example, the zero speed 412 is shown to be 0 miles per hour or 0 kilometers per hour.

The vehicle control circuit 206 can execute a reading 414 for the on-board diagnostics 222 to determine the vehicle speed 402 of the electric vehicle 202, the combustion vehicle 224, or a combination thereof. The reading 414 is a process or a command for retrieving information for the on-board diagnostics 222 from the electric vehicle 202, the combustion vehicle 224, or a combination thereof. For this example, the reading 414 can be repeated to receive the vehicle speed 402 from the on-board diagnostics 222 and the speed profile 404 can be generated based on the multiple values of the vehicle speed 402. Based on the value for the vehicle speed 402, the speed profile 404 can include the moving periods 406 and the stop periods 408.

The vehicle speed 402 can represent the speed value or level of the electric vehicle 202, the combustion vehicle 224, or a combination thereof at the time of the reading 414. For example, the vehicle speed 402 can represent the zero speed 412 when the reading 414 is taken during the stop periods 408. As a further example, the vehicle speed 402 can represent the non-zero speed 410 when the reading 414 is taken during the moving periods 406.

Figure 5:
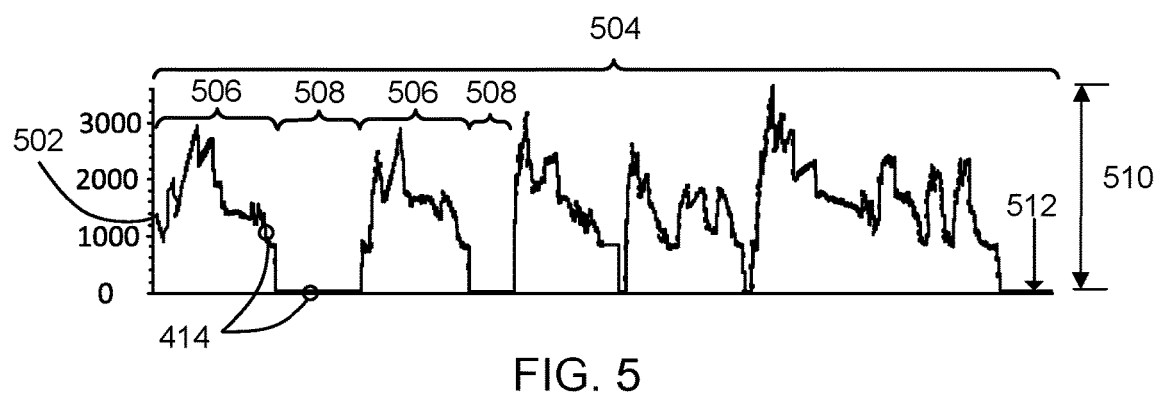
FIG. 5 is a graphical view of an example of a revolutions per minute.

Referring now to FIG. 5, therein is shown a graphical view of an example of a revolutions per minute 502 (RPM). The revolutions per minute 502 can represent the engine activity for the combustion engine 211 of FIG. 2, the combustion portion 207 of FIG. 2 of the hybrid engine 205 of FIG. 2, or a combination thereof. The graphical view depicts an example of revolutions per minute levels or values for the on-board diagnostics 222 of FIG. 2 of the combustion vehicle 224 of FIG. 2, the electric vehicle 202 of FIG. 2 with the hybrid engine 205 of FIG. 2, or a combination thereof.

The revolutions per minute graphical view in FIG. 5 does not depict revolutions per minute levels or values for the electric engine 203 of FIG. 2 or the electric portion 209 of FIG. 2 of the hybrid engine 205. The description for this revolutions per minute graphical view is not applicable for the electric vehicle 202 with only the electric engine 203.

The revolutions per minute graphical view depicts the revolutions per minute levels or revolutions per minute values when the combustion engine 211, the combustion portion 207 of the hybrid engine 205, or a combination thereof automatically turns off while the combustion vehicle 224 or the electric vehicle 202 with the hybrid engine 205 is still in operation.

The revolutions per minute graphical view depicts a revolutions profile 504 relative to a y-axis and an x-axis. The y-axis represents the revolutions per minute values or revolutions per minute levels for the combustion engine 211, the combustion portion 207 of the hybrid engine 205, or a combination thereof. The values noted on the y-axis are shown as examples and embodiments are not limited to the values shown along the y-axis. The x-axis represents time although units for the x-axis is not shown in FIG. 5.

The revolutions profile 504 represents revolutions per minute values or revolutions per minute levels for the combustion engine 211, the combustion portion 207 of the hybrid engine 205, or a combination thereof. For example, the revolutions profile 504 can depict the values for the revolutions per minute 502 over time. The revolutions profile 504 can be generated based on the revolutions per minute 502 from the on-board diagnostics 222. In this example, the revolutions profile 504 is shown to include engine running periods 506 and engine off periods 508.

The engine running periods 506 are when the combustion engine 211, the combustion portion 207 of the hybrid engine 205, or a combination thereof is on or running. This example shows the revolutions profile 504 with the engine running periods 506 intermixed with the engine off periods 508. The engine running periods 506 have a non-zero revolution 510 for the revolutions per minute 502.

The non-zero revolution 510 is the revolutions per minute level or revolutions per minute value for the combustion engine 211, the combustion portion 207 of the hybrid engine 205, or a combination thereof is on and running. The non-zero revolution 510 can be determined from the revolutions per minute 502 from the on-board diagnostics 222. Continuing with this example, the non-zero revolution 510 is greater than 0 revolutions per minute.

The engine off periods 508 are when the combustion engine 211, the combustion portion 207 of the hybrid engine 205, or a combination thereof is off, not running, or a combination thereof. The engine off periods 508 has a zero revolution 512 for the revolutions per minute 502.

The zero revolution 512 is the revolutions per minute value or revolutions per minute level for the combustion engine 211, the combustion portion 207 of the hybrid engine 205, or a combination thereof is off or not running. The zero revolution 512 can be determined from the revolutions per minute 502 from the on-board diagnostics 222. In this example, the zero revolution 512 is shown to be 0 revolutions per minute.

The vehicle control circuit 206 can execute the reading 414 for the on-board diagnostics 222 to determine the revolutions per minute 502 of the combustion engine 211, the combustion portion 207 of the hybrid engine 205, or a combination thereof. For this example, the reading 414 can be repeated to receive the revolutions per minute 502 from the on-board diagnostics 222 and the revolutions profile 504 can be generated based on the multiple values of the revolutions per minute 502. Based on the value for the revolutions per minute 502, the revolutions profile 504 can include the engine running periods 506 and the engine off periods 508.

The revolutions per minute 502 can represent the revolutions per minute value or revolutions per minute level of the combustion engine 211, the combustion portion 207 of the hybrid engine 205, or a combination thereof at the time of the reading 414. For example, the revolutions per minute 502 can represent the zero revolution 512 when the reading 414 is taken during the engine off periods 508. As a further example, the revolutions per minute 502 can represent the non-zero revolution 510 when the reading 414 is taken during the engine running periods 506.

Figure 6:
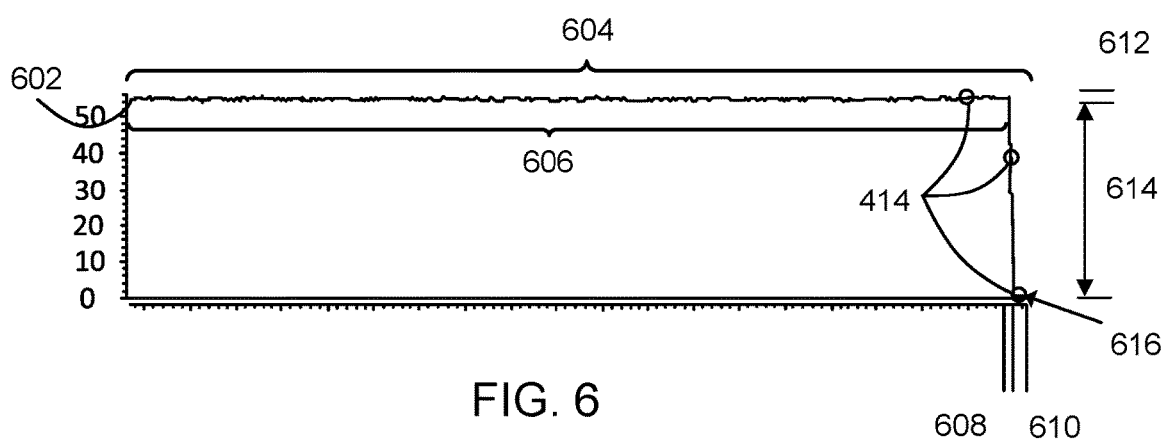
FIG. 6 is a graphical view of an example of an activity level of the vehicle.

Referring now to FIG. 6, therein is shown an activity graphical view of an example of an activity level 602. The activity level 602 represents the traffic over the vehicle bus 232 of FIG. 2. For example, the activity level 602 can also be represented by percentage of full bandwidth utilized by the vehicle bus 232. Also for example, the activity level 602 can further represent the number of packets or bytes being transmitted over the vehicle bus 232. In this example, value for the activity level 602 can be determined based on a read for the on-board diagnostics 222 of FIG. 2 of the electric vehicle 202 of FIG. 2, the combustion vehicle 224 of FIG. 2, or a combination thereof.

The activity graphical view depicts the activity level 602 when the electric vehicle 202, the combustion vehicle 224, or a combination thereof is on and then turned off.

The activity graphical view depicts an activity profile 604 relative to a y-axis and an x-axis. The y-axis represents the activity traffic values or levels for the activity level 602. The values shown on the y-axis are examples and embodiments are not limited to the values shown along the y-axis. The x-axis represents time although units for the x-axis is not shown in FIG. 6.

The activity profile 604 represents activity levels or activity values over time for the vehicle bus 232 for various activities of the electric vehicle 202, the combustion vehicle 224, or a combination thereof. For example, the activity profile 604 can depict the values for the activity level 602 over time. The activity profile 604 can be generated based on the activity level 602 from the on-board diagnostics 222. In this example, the activity profile 604 is shown to include a running period 606, a transition period 608, and an off period 610.

The running period 606 is when the vehicle bus 232 of the electric vehicle 202, the combustion vehicle 224, or a combination thereof is in use and operating. This example shows the activity profile 604 with the running period 606 proceeding the transition period 608 and the off period 610. The running period 606 has a running level 612 for the activity level 602.

The running level 612 is the activity level 602 for the vehicle bus 232 when the electric vehicle 202, the combustion vehicle 224, or a combination thereof is on and operating. The running level 612 can be determined from the activity level 602 from the on-board diagnostics 222. Continuing with this example, the running level 612 is shown to be between 52 percent and 56 percent.

The transition period 608 is a portion of the activity profile 604 for the vehicle bus 232 when the electric vehicle 202, the combustion vehicle 224, or a combination thereof is turning off. This example shows the activity profile 604 with the transition period 608 after the running period 606 and before the off period 610. As in this example, during the transition period 608, the activity profile 604 sharply drops from activity percentage levels or values at the running level 612 to a transition level 614.

The transition level 614 is a portion of the activity profile 604 for the vehicle bus 232 following a turning off of the electric vehicle 202, the combustion vehicle 224, or a combination thereof. The transition level 614 can be determined from the activity level 602 read from the on-board diagnostics 222. Continuing with this example, the activity percentage values for the transition level 614 is below 52 percent and greater than 0 percent.

The off period 610 is a portion of the activity profile 604 for the vehicle bus 232 when the electric vehicle 202, the combustion vehicle 224, or a combination thereof is off and no longer in operation. This example shows the activity profile 604 with an off period 610 following the running period 606 and the transition period 608. As in this example, during the off period 610, the activity profile 604 drops from the activity percentage level or value at the running level 612 and the transition level 614 to an off level 616.

The off level 616 is the activity percentage levels or values for the vehicle bus 232 when the electric vehicle 202, the combustion vehicle 224, or a combination thereof is off and not operating. The off level 616 can be determined from the activity level 602 from the on-board diagnostics 222. Continuing with this example, the activity percentage values for the off level 616 is shown to be nearly 0 percent.

The vehicle control circuit 206 can execute the reading for the on-board diagnostics 222 to determine the activity level 602 of the vehicle bus 232. For this example, the reading 414 can be repeated to receive the activity level 602 from the on-board diagnostics 222 and the activity profile 604 can be generated based on the multiple values of the activity level 602. Based on the value for the activity level 602, the activity profile 604 can include the running period 606, the transition period 608, and the off period 610.

The activity level 602 can represent the activity percentage level or value of the vehicle bus 232 at the time of the reading 414. For example, the activity level 602 can represent the off level 616 when the reading is taken during the off period 610. As a further example, the activity level 602 can represent the transition level 614 when the reading 414 is taken during the transition period 608. As a further example, the activity level 602 can represent the running level 612 when the reading 414 is taken during the running period 606.

Figure 7:
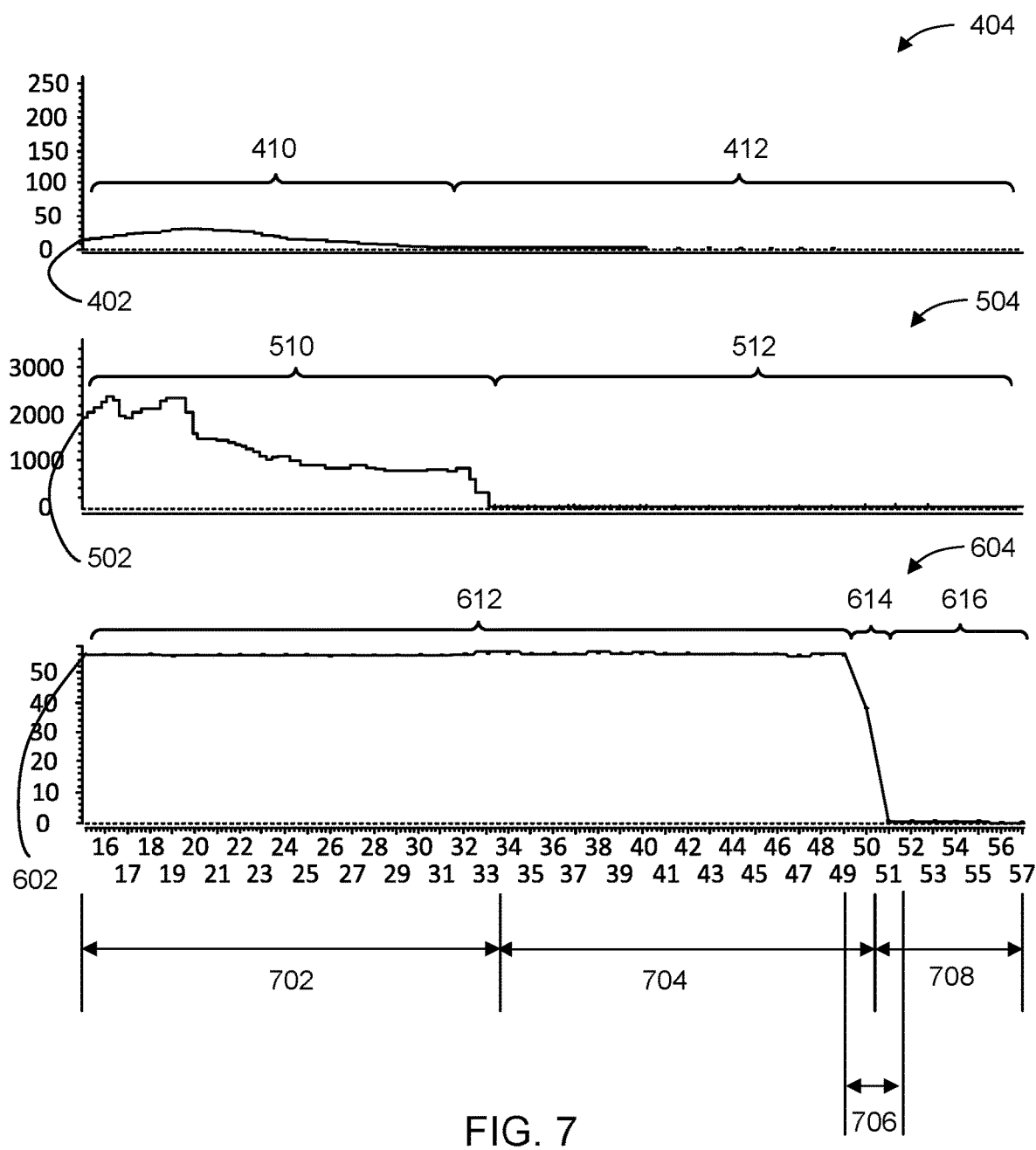
FIG. 7 is a combination graphical view as an example for the speed profile, the revolutions profile, and the activity profile.

Referring now to FIG. 7, therein is shown a combination graphical view as an example for the speed profile 404, the revolutions profile 504, and the activity profile 604. The combination graphical view depicts a juxtaposition of examples of a portion of the speed profile 404 at the top, the revolutions profile 504 at the middle, and the activity profile 604 at the bottom. The example shown in FIG. 7 is for a single instance for the electric vehicle 202, the combustion vehicle 224, or a combination thereof. The elements described in FIG. 7 have the same description as in FIG. 4, FIG. 5, and FIG. 6 and all have not been repeated in FIG. 7 for brevity.

The speed profile 404, the revolutions profile 504, and the activity profile 604 are depicted relative to a y-axis and an x-axis. The y-axis represents the respective values or levels for the speed profile 404, the revolutions profile 504, and the activity profile 604. The values noted on the y-axis are shown as examples and embodiments are not limited to the values shown along the y-axis. The x-axis represents time. The values noted on the x-axis are shown as examples and embodiments are not limited to the values shown along the x-axis.

The juxtaposition of the speed profile 404, the revolutions profile 504, and the activity profile 604 represent when the electric vehicle 202, the combustion vehicle 224, or a combination thereof is on and then turned off. In this example, the combination graphical view is shown to include an operating state 702, a stop-event 704, an offset delay 706, and a true off state 708 based on the reading 414 of FIG. 4, FIG. 5, and FIG. 6 of the on-board diagnostics 222 of FIG. 2.

The operating state 702 is when the electric engine 203, the combustion engine 211, the hybrid engine 205, or a combination thereof is on and in operation. For example, the operating state 702 can be determined for the electric engine 203, the combustion engine 211, the hybrid engine 205, or a combination thereof when the activity level 602 is at the running level 612.

Also for example, the operating state 702 can be confirmed for the electric engine 203, the combustion engine 211, the hybrid engine 205, or a combination thereof when the vehicle speed 402 is determined to be at the non-zero speed 410. As a further example, the operating state 702 can also be confirmed for the combustion engine 211, the combustion portion 207 of the hybrid engine 205, or a combination thereof when the revolutions per minute 502 is determined to be at the non-zero revolution 510.

The stop-event 704 is when the electric engine 203, the combustion engine 211, the hybrid engine 205, or a combination thereof is turned off but still in operation. This example shows the speed profile 404, the revolutions profile 504, and the activity profile 604 with the stop-event 704 following the operating state 702.

For example, the stop-event 704 for the electric engine 203, the combustion engine 211, the hybrid engine 205, or a combination thereof can be determined when the activity level 602 is at the running level 612 while the revolutions per minute 502 is at the zero revolution 512, the vehicle speed 402 is at the zero speed 412, or a combination thereof.

The offset delay 706 is amount of time from when the activity level 602 drops to the off level 616 before the determination is made for the true off state 708. For example, during the offset delay 706 the electric engine 203, the combustion engine 211, the hybrid engine 205, or a combination thereof can be at the stop-event 704 or at the true off state 708.

In the example shown in FIG. 7, the speed profile 404, the revolutions profile 504, and the activity profile 604 is shown with the offset delay 706 following the stop-event 704. As an example, the combination graphical view depicts portions of the activity level 602 and the transition level 614 for the electric engine 203, the combustion engine 211, the hybrid engine 205, or a combination thereof.

The true off state 708 is when the electric engine 203, the combustion engine 211, the hybrid engine 205, or a combination thereof is off and not merely the stop-event 704. As an example, the true off state 708 can be initially determined for the electric engine 203, the combustion engine 211, the hybrid engine 205, such as the combustion portion 207 and the electric portion 209, or a combination thereof with the activity level 602 dropping below the running level 612 to the transition level 614. Further for example, the true off state 708 can be further determined when the activity level 602 is detected at the off level 616.

The true off state 708 can be confirmed for the electric engine 203, the combustion engine 211, the hybrid engine 205, or a combination thereof when the reading 414 of the on-board diagnostics 222 provides the vehicle speed 402 is at the zero speed 412. For example, the true off state 708 can be confirmed where the instance of the reading 414 provides the vehicle speed 402 is at the zero speed 412 after the offset delay 706 from a previous instance of the reading 414 where the vehicle speed 402 was also at the zero speed 412.

The true off state 708 for the combustion engine 211, the combustion portion 207 of the hybrid engine 205, or a combination thereof can be determined with the reading 414 of the on-board diagnostics 222 provides the revolutions per minute 502 is at the zero revolution 512 where this instance of the reading 414 is after the offset delay 706 from a previous instance of the reading 414 where the revolutions per minute 502 was also at the zero revolution 512.

The true off state 708 is when the electric engine 203, the combustion engine 211, the hybrid engine 205, or a combination thereof is turned off as opposed to the stop-event 704. The true off state 708 allows the electric vehicle 202, the combustion vehicle 224, the vehicle system 100, or a combination thereof to accurately detect or generate or calculate the vehicle usage 234.

Figure 8:
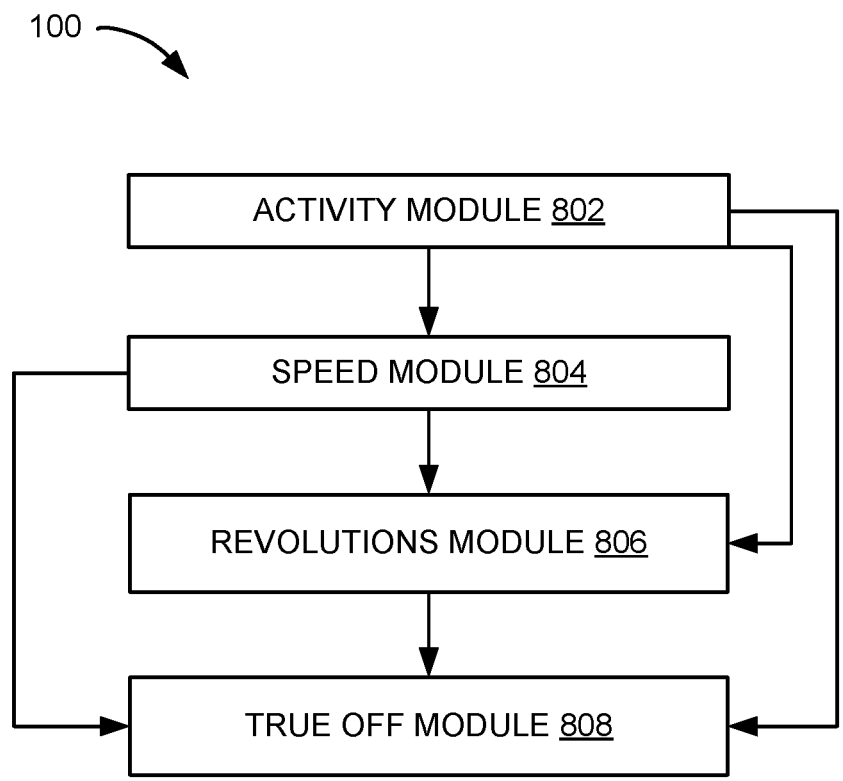
FIG. 8 is a control flow of the vehicle system.

Referring now to FIG. 8, therein is shown a control flow of the vehicle system 100. The control flow in FIG. 8 depicts and describes an example of how to determine whether the electric engine 203 of FIG. 2, the combustion engine 211 of FIG. 2, the hybrid engine 205 of FIG. 2, or a combination thereof is within the operating state 702 of FIG. 7, the stop-event 704 of FIG. 7, or the true off state 708 of FIG. 7 based on the reading 414 of FIG. 4, FIG. 5, and FIG. 6 from the on-board diagnostics 222 of FIG. 2.

For illustrative purposes, the vehicle system 100 is described in FIG. 8 relative to FIG. 7, although it is understood that the description in FIG. 8 can be applicable to other embodiments. For example, the order of the modules described in FIG. 8 can be in different order. Also for example, some of the modules in FIG. 8 can be optional, as further described below.

The vehicle system 100 can include an activity module 802, a speed module 804, a revolutions module 806, a true off module 808, or a combination thereof. The aforementioned modules can be included in the first software 326 of FIG. 3, the second software 342 of FIG. 3, or a combination thereof. The first software 326, the second software 342, or a combination thereof can be executed with the first control circuit 312 of FIG. 3, the second control circuit 334 of FIG. 3, the vehicle control circuit 206 of FIG. 2, or a combination thereof.

As an example, the activity module 802 can be coupled to the speed module 804 and the true off module 808. Also as an example, the speed module 804 can be coupled to the revolutions module 806 and the true off module 808. Further as an example, the revolutions module 806 can be coupled to the true off module 808.

The modules can be coupled using wired or wireless connections, by including an output of one module as an input of the other module, by including operations of one module influence operation of the other module, or a combination thereof. The module can be directly coupled with no intervening structures or objects other than the connector there-between, or indirectly coupled.

The activity module 802 determines the activity level 602 of FIG. 6 on the vehicle bus 232 of FIG. 2. For example, the activity module 802 is configured to receive the on-board diagnostics 222 for the activity level 602. As described earlier, the reading 414 of FIG. 6 of the activity level 602 can be provided from the on-board diagnostics 222.

The activity module 802 can determine whether the electric engine 203, the combustion engine 211, the hybrid engine 205, or a combination thereof is within the operating state 702, the stop-event 704, or the true off state 708 based on or partially based on the activity level 602 as described in FIG. 7.

For example, when the activity level 602 is at the running level 612 of FIG. 7, the activity module 802 can detect that the electric engine 203, the combustion engine 211, the hybrid engine 205, or a combination thereof is within the operating state 702 or the stop-event 704. The activity module 802 can determine that the activity level 602 has dropped below the running level 612 of FIG. 7.

Continuing with the example, when the activity level 602 is at the transition level 614 where the activity level 602 is below the running level 612, the activity module 802 can detect that the electric engine 203, the combustion engine 211, the hybrid engine 205, or a combination thereof is within the stop-event 704 or the true off state 708. As a further example, when the activity level 602 is at the off level 616, the flow can progress to the true off module 808 to determine the true off state 708.

The activity module 802 can receive the on-board diagnostics 222 with one or more communication circuits, such as the first communication circuit 316, the second communication circuit 336, the vehicle communication circuit 204, or a combination thereof. The activity module 802 can process the on-board diagnostics 222 to determine the activity level 602 operating one or more control circuits, such as the first control circuit 312, the second control circuit 334, the vehicle control circuit 206, or a combination thereof. The activity module 802 can store the on-board diagnostics 222, the reading 414 of the activity profile 604, or a combination thereof in one or more storage circuits, such as the first storage circuit 314 of FIG. 3, the second storage circuit 346 of FIG. 3, the vehicle storage circuit 208 of FIG. 2, or a combination thereof.

The flow can progress to the true off module 808 to reduce processing and for a faster response to determine the true off state 708. The flow can also progress to the speed module 804 for additional information to confirm the true off state 708 in addition to the activity level 602 for a more robust and reliable determination.

The speed module 804 determines the vehicle speed 402. As an example, the speed module 804 can receive the on-board diagnostics 222 for the electric vehicle 202, the combustion vehicle 224, or the combination thereof. As described earlier, the reading 414 of FIG. 4 of the on-board diagnostics 222 can provide the vehicle speed 402. The speed module 804 can be part of the determination of whether the electric engine 203, the combustion engine 211, the hybrid engine 205, or the combination thereof is within the operating state 702, the stop-event 704, or the true off state 708 of FIG. 7 based on the vehicle speed 402.

For example, the speed module 804 can be part of the determination that the electric engine 203, the combustion engine 211, the hybrid engine 205, or the combination thereof is within the operating state 702 when the vehicle speed 402 is at the non-zero speed 410. The speed module 804 can confirm that the electric engine 203, the combustion engine 211, the hybrid engine 205, or the combination thereof is within the operating state 702 utilizing the outputs from the activity module 802.

For example, the speed module 804 can confirm that the electric engine 203, the combustion engine 211, the hybrid engine 205, or the combination thereof is at the operating state 702 when the activity level 602 is at the running level 612 or not the off level 616.

Continuing with the example, the speed module 804 can determine that the electric engine 203, the combustion engine 211, the hybrid engine 205, or the combination thereof is within the stop-event 704 or the true off state 708 when the vehicle speed 402 is at the zero speed 412. The speed module 804 can filter out whether the electric engine 203, the combustion engine 211, the hybrid engine 205, or the combination thereof is within the stop-event 704 or the true off state 708 based on the outputs from the activity module 802.

For example, the speed module 804 can detect that the electric engine 203, the combustion engine 211, the hybrid engine 205, or the combination thereof is within the stop-event 704 when the vehicle speed 402 is at the zero speed 412 when the activity level 602 is at the running level 612. As a further example, when the vehicle speed 402 is at the zero speed 412 and the activity level 602 is at the off level 616, the flow can progress to the true off module 808 to determine the true off state 708.

The speed module 804 can receive the on-board diagnostics 222 with one or more communication circuits, such as the first communication circuit 316, the second communication circuit 336, the vehicle communication circuit 204, or a combination thereof. The speed module 804 can process the on-board diagnostics 222 to determine the vehicle speed 402 operating one or more control circuits, such as the first control circuit 312, the second control circuit 334, the vehicle control circuit 206, or a combination thereof. The speed module 804 can store the on-board diagnostics 222, the reading 414 of the speed profile 404, or a combination thereof in one or more storage circuits, such as the first storage circuit 314 of FIG. 3, the second storage circuit 346 of FIG. 3, the vehicle storage circuit 208 of FIG. 2, or a combination thereof.

The flow can progress with the true off module 808 for the electric vehicle 202 with only the electric engine 203. The control flow can also progress to the revolutions module 806 for additional information to confirm the true off state 708 in addition to the activity level 602 and the vehicle speed 402 for the electric vehicle 202 with the hybrid engine 205, the combustion vehicle 224, or a combination thereof.

The revolutions module 806 determines the revolutions per minute 502. As an example, the revolutions module 806 can receive the on-board diagnostics 222 for the electric vehicle 202 with the hybrid engine 205, the combustion vehicle 224, or a combination thereof. As described earlier, the reading 414 of FIG. 5 of the on-board diagnostics 222 can provide the revolutions per minute 502. The revolutions module 806 is not required for the electric vehicle 202 with only the electric engine 203.

The revolutions module 806 can be part of the determination of whether the combustion portion 207 of the hybrid engine 205, the combustion engine 211, or a combination thereof is within the operating state 702, the stop-event 704, or the true off state 708 of FIG. 7 based on the revolutions per minute 502.

When the revolutions per minute 502 is at the non-zero revolution 510, the revolutions module 806 can be part of the determination that the combustion portion 207 of the hybrid engine 205, the combustion engine 211, or a combination thereof is within the operating state 702. The revolutions module 806 can confirm that the combustion portion 207 of the hybrid engine 205, the combustion engine 211, or the combination thereof is within the operating state 702 utilizing the outputs from the activity module 802, the speed module 804, or a combination thereof.

For example, the revolutions module 806 can confirm that the combustion portion 207 of the hybrid engine 205, the combustion engine 211, or a combination thereof is within the operating state 702 when the activity level 602 is at the running level 612, the vehicle speed 402 is at the non-zero speed 410, or a combination thereof.

For example, the revolutions module 806 can determine that the combustion portion 207 of the hybrid engine 205, the combustion engine 211, or a combination thereof is within the stop-event 704 or the true off state 708 when the revolutions per minute 502 is at the zero revolution 512. The revolutions module 806 can filter out whether the combustion portion 207 of the hybrid engine 205, the combustion engine 211, or a combination thereof is within the stop-event 704 or the true off state 708 based on the outputs from the activity module 802.

The revolutions module 806 can detect that the combustion portion 207 of the hybrid engine 205, the combustion engine 211, or a combination thereof is within the stop-event 704 when the revolutions per minute 502 is at the zero revolution 512 when the activity level 602 is at the running level 612. As a further example, when the revolutions per minute 502 is at the zero revolution 512 and the activity level 602 is at the off level 616, the flow can progress to the true off module 808 to determine the true off state 708.

The revolutions module 806 can receive the on-board diagnostics 222 with one or more communication circuits, such as the first communication circuit 316, the second communication circuit 336, the vehicle communication circuit 204, or a combination thereof. The revolutions module 806 can process the on-board diagnostics 222 to determine the revolutions per minute 502 operating one or more control circuits, such as the first control circuit 312, the second control circuit 334, the vehicle control circuit 206, or a combination thereof. The revolutions module 806 can store the on-board diagnostics 222, the reading 414 of the revolutions per minute 502, or a combination thereof in one or more storage circuits, such as the first storage circuit 314 of FIG. 3, the second storage circuit 346 of FIG. 3, the vehicle storage circuit 208 of FIG. 2, or a combination thereof.

The flow can progress to the true off module 808.

The true off module 808 determines the activity level 602, the vehicle speed 402, the revolutions per minute 502, or a combination thereof based off the reading 414 from the on-board diagnostics 222. For example, the true off module 808 is configured to receive the on-board diagnostics 222 for the activity level 602, the vehicle speed 402, and the revolutions per minute 502. As described earlier, the reading 414 of FIG. 6, FIG. 7, and FIG. 8 of the activity level 602, the vehicle speed 402, and the revolutions per minute 502 can be provided from the on-board diagnostics 222.

The true off module 808 can determine the true off state 708 in a number of ways. For example, the true off module 808 can determine the true off state 708 for the electric engine 203, the combustion engine 211, the hybrid engine 205, or a combination thereof based on or partially based on the activity level 602, the vehicle speed 402, the revolutions per minute 502, or a combination thereof.

For example, when the activity level 602 is at the off level 616 following the offset delay 706, the true off module 808 can determine that the electric engine 203, the combustion engine 211, the hybrid engine 205, or a combination thereof is at the true off state 708.

Continuing with the example, when the vehicle speed 402 is at the zero speed 412 following the offset delay 706, the true off module 808 can confirm that the electric engine 203, the combustion engine 211, the hybrid engine 205, or a combination thereof is within the true off state 708.

As a further example, when the revolutions per minute 502 is at the zero revolution 512 following the offset delay 706, the true off module 808 can confirm that the combustion portion 207 of the hybrid engine 205, the combustion engine 211, or a combination thereof is within the true off state 708.

The true off module 808 can receive or transmit information or data with one or more communication circuits, such as the first communication circuit 316, the second communication circuit 336, the vehicle communication circuit 204, or a combination thereof. The true off module 808 can store the information or data generated or received in one or more storage circuits, such as the first storage circuit 314, the second storage circuit 346, the vehicle storage circuit 208, or a combination thereof. The true off module 808 can perform the processing with one or more control circuits, such as the first control circuit 312, the second control circuit 334, the vehicle control circuit 206, or a combination thereof.

The true off module 808 can provide the on-board diagnostics 222 information to calculate vehicle usage 234 based on the determination of the true off state 708. For example, the on-board diagnostics 222 can accurately calculate vehicle usage 234 of the electric vehicle 202, the combustion vehicle 224, or a combination thereof based on the true off state 708.

It has been discovered that the vehicle system 100, the electric vehicle 202, the combustion vehicle 224, or a combination thereof can minimize the complexity to detect the true off state 708 by eliminating the need for processing the information for the vehicle speed 402. The off level 616 of the activity level 602 provides the determination of the true off state 708 for the electric vehicle 202 or the combustion vehicle 224.

It has been yet further discovered that the vehicle system 100, the electric vehicle 202 with the hybrid engine 205, the combustion vehicle 224, or a combination thereof can minimize the complexity to detect the true off state 708 by eliminating the need for processing the information for the revolutions per minute 502. The off level 616 of the activity level 602 provides the determination of the true off state 708 for the electric vehicle 202 with the hybrid engine 205 or the combustion vehicle 224.

It has been yet further discovered that the vehicle system 100, the electric vehicle 202, the combustion vehicle 224, or a combination thereof can improve the reliability of the true off state 708 not only by confirming the activity level 602 at the off level 616 but also the vehicle speed 402 at the zero speed 412.

It has been yet further discovered that the vehicle system 100, the electric vehicle 202 with the hybrid engine 205, the combustion vehicle 224, or a combination thereof can improve the reliability of the true off state 708 not only by confirming the activity level 602 at the off level 616 but also the revolutions per minute 502 at the zero revolution 512.

It has been yet further discovered that the simplified and robust determination of the activity level 602 and detection of the true off state 708 allows for the vehicle system 100, the electric vehicle 202, the combustion vehicle 224, or a combination thereof to properly calculate the vehicle usage 234. As an example, navigation systems can accurately detect trips to gather accurate records for the electric vehicle 202 or the combustion vehicle 224. Also as an example, the electric vehicle 202 or the combustion vehicle 224 can accurately calculate mileage, fuel utilization, etc.

The modules described in this application can be hardware implementation or hardware accelerators, including passive circuitry, active circuitry, or both, in the first storage circuit 314, the second storage circuit 346, the first control circuit 312, the second control circuit 334, or a combination thereof. The module can also be hardware implementation or hardware accelerators, including passive circuitry, active circuitry, or both, within the first device 102, the second device 106, or a combination thereof but outside of the first storage circuit 314, the second storage circuit 346, the first control circuit 312, the second control circuit 334, or a combination thereof.

The vehicle system 100 has been described with module functions or order as an example. The vehicle system 100 can partition the modules differently or order the modules differently. For example, the vehicle system 100 can be without the speed module 804. Also for example, the vehicle system 100 can be without the revolutions module 806.

For illustrative purposes, the various modules have been described as being specific to the first device 102, the second device 106, the electric vehicle 202, or the combustion vehicle 224. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units or circuits.

The modules described in this application can be stored in the non-transitory computer readable medium. The first storage circuit 314, the second storage circuit 346, or a combination thereof can represent the non-transitory computer readable medium. The first storage circuit 314, the second storage circuit 346, the vehicle storage circuit 208, or a combination thereof, or a portion therein can be removable from the first device 102, the second device 106, the electric vehicle 202, the combustion vehicle 224, or a combination thereof. Examples of the non-transitory computer readable medium can be a non-volatile memory card or stick, an external hard disk drive, a tape cassette, or an optical disk.

The physical transformation of the on-board diagnostics 222, the reading 414 of FIG. 4 of the activity level 602, the reading 414 of FIG. 4 of the vehicle speed 402, the reading 414 of FIG. 4 of the revolutions per minute 502 of FIG. 5, and the true off state 708 of FIG. 7 representing the real-world environment results in the real-time movement in the physical world, such as physical change in information or environment processed for the user on one or more of the devices or physical displacement of the electric vehicle 202, the combustion vehicle 224, or a combination thereof. Movement in the physical world results in updates to the electric vehicle 202, the combustion vehicle 224, or a combination thereof, which can be fed back into the vehicle system 100 and further influence operation or update the electric vehicle 202, the combustion vehicle 224, or a combination thereof.

Figure 9:
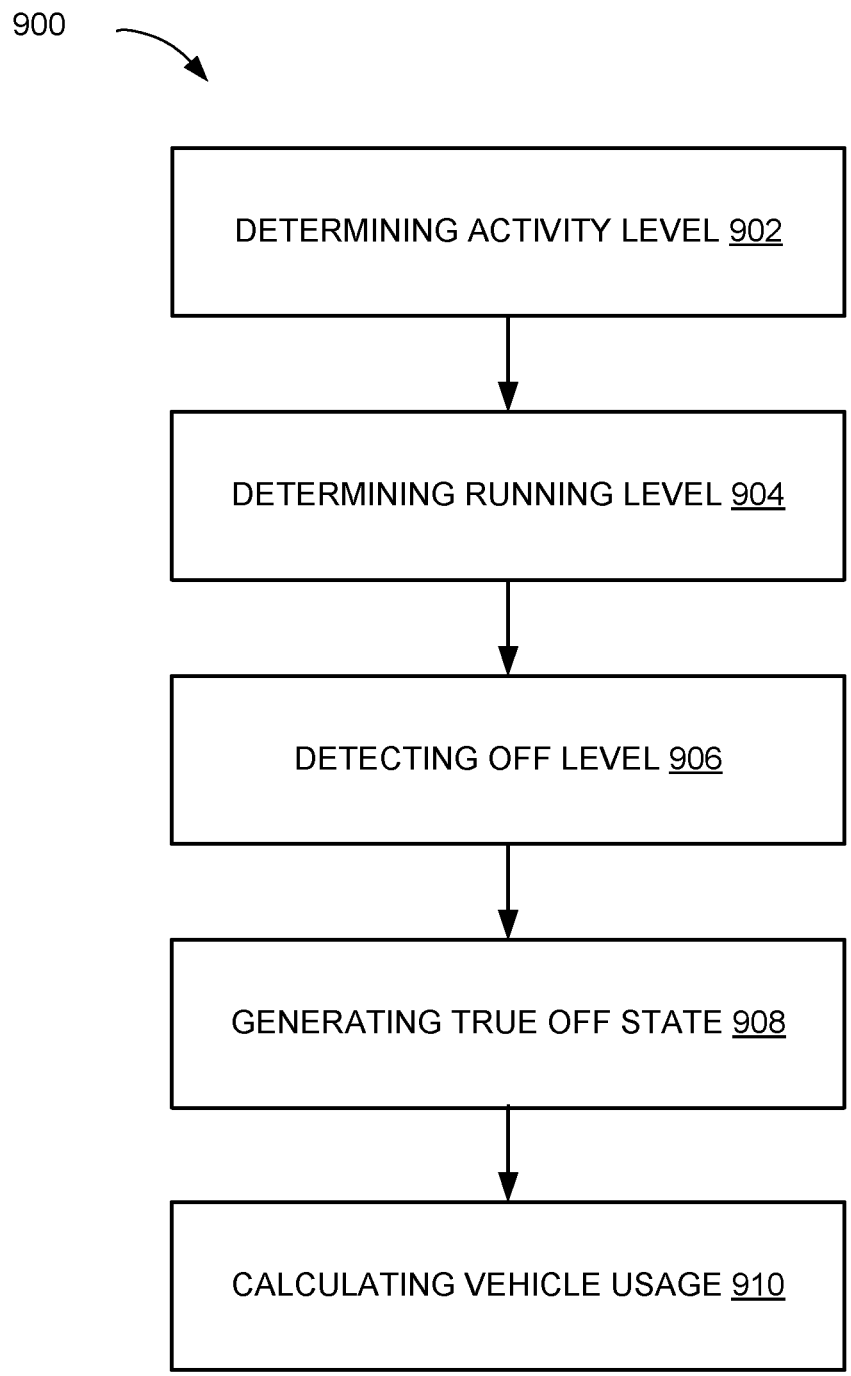
FIG. 9 is a flow chart of a method of operation of a vehicle system in an embodiment of the present invention.

Referring now to FIG. 9, therein is shown a flow chart of a method 900 of operation of a vehicle system 100 in an embodiment of the present invention. The method 900 includes: determining activity level in a box 902; determining running level in a box 904; detecting off level in a box 906; generating true off state in a box 908; and calculating vehicle usage in a box 910.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation for a vehicle system comprising:
   determining an activity level of a vehicle bus;
   determining a running level for the activity level for a running period;
   detecting an off level for the activity level dropping from the running level;
   generating a true off state for an engine based on the off level; and
   calculating vehicle usage based on the true off state.

2. The method as claimed in claim 1 wherein detecting the off level includes:
   detecting a transition level for the activity level dropping from the running level; and
   detecting the off level dropping from the transition level.

3. The method as claimed in claim 1 further comprising:
   determining a vehicle speed for a vehicle including the vehicle bus;
   determining a zero speed for the vehicle speed; and
   wherein generating the true off state for the engine includes:
   detecting the true off state based on the zero speed.

4. The method as claimed in claim 1 further comprising:
   determining a revolutions per minute for the engine;
   determining a zero revolution for the revolutions per minute; and
   wherein generating the true off state for the engine includes:
   detecting the true off state based on the zero revolution.

5. The method as claimed in claim 1 further comprising:
   determining a revolutions per minute for the engine;
   determining a zero revolution for the revolutions per minute; and
   wherein generating the true off state for the engine includes:
   detecting the true off state based on the zero revolution and after an offset delay between the zero revolution and the off level.

6. The method as claimed in claim 1 further comprising filtering out a stop-event for the engine as the true off state with the activity level of the vehicle bus.

7. The method as claimed in claim 1 wherein generating the true off state for the engine includes generating the true off state for the engine as an electric engine or an electric portion of a hybrid engine.

8. A vehicle system comprising:
   a communication circuit configured to:
   determine an activity level of a vehicle bus,
   determine a running level for the activity level for a running period;
   a control circuit, coupled to the communication circuit, configured to:
   detect an off level for the activity level dropping from the running level,
   generate a true off state for an engine based on the off level, and
   calculate vehicle usage based on the true off state.

9. The system as claimed in claim 8 wherein the control circuit is further configured to:
   detect a transition level for the activity level dropping from the running level and
   detect the off level dropping from the transition level.

10. The system as claimed in claim 8 wherein the control circuit is further configured to:
    determine a vehicle speed for a vehicle including the vehicle bus;
    determine a zero speed for the vehicle speed; and
    detect the true off state based on the zero speed.

11. The system as claimed in claim 8 wherein the control circuit is further configured to:
    determine a revolutions per minute for the engine;
    determine a zero revolution for the revolutions per minute; and
    detect the true off state based on the zero revolution.

12. The system as claimed in claim 8 wherein the control circuit is further configured to:
    determine a revolutions per minute for the engine;
    determine a zero revolution for the revolutions per minute; and
    detect the true off state based on the zero revolution and after an offset delay between the zero revolution and the off level.

13. The system as claimed in claim 8 wherein the control circuit is further configured to filter out a stop-event for the engine as the true off state with the activity level of the vehicle bus.

14. The system as claimed in claim 8 wherein the control circuit is further configured to generate the true off state for the engine as an electric engine or an electric portion of a hybrid engine.

15. A non-transitory computer readable medium including instructions executable by a control circuit for a vehicle system comprising:
    determining an activity level of a vehicle bus;
    determining a running level for the activity level for a running period;
    detecting an off level for the activity level dropping from the running level;
    generating a true off state for an engine based on the off level; and
    calculating a vehicle usage based on the true off state.

16. The non-transitory computer readable medium as claimed in claim 15 further comprising detecting a transition level for the activity level dropping from the running level and detecting the off level dropping from the transition level.

17. The non-transitory computer readable medium as claimed in claim 15 further comprising:
    determining a vehicle speed for a vehicle including the vehicle bus;
    determining a zero speed for the vehicle speed; and
    detecting the true off state based on the zero speed.

18. The non-transitory computer readable medium as claimed in claim 15 further comprising:
    determining a vehicle speed for a vehicle including the vehicle bus;
    determining a zero revolution for the revolutions per minute; and
    detecting the true off state based on the zero revolution.

19. The non-transitory computer readable medium as claimed in claim 15 further comprising:
    determining a revolutions per minute for the engine;

determining a zero revolution for the revolution per minute; and detecting the true off state based on the zero revolution and after an offset delay between the zero revolution and the off level.

20. The non-transitory computer readable medium as claimed in claim 15 further comprising filtering out a stop-event for the engine as the true off state with the activity level of the vehicle bus.

* * * * *